3,657,150
SOLID CATALYSTS CONTAINING SILICIUM PHOSPHATE, THEIR MANUFACTURE AND USE
Bernard Juguin and Jean Francois Le Page, Rueil-Malmaison, France, assignors to Institut Francais du Petrole des Carburants et Lubrifiants, Rueil-Malmaison, France
No Drawing. Filed Oct. 27, 1969, Ser. No. 869,860
Claims priority, application France, Oct. 31, 1968, 172,358
Int. Cl. B01j 11/82
U.S. Cl. 252—435                                    13 Claims

ABSTRACT OF THE DISCLOSURE

For alkylating or isomerizing mono- or polyolefins, e.g. production of isooctene from butene, there are provided novel catalyst consisting essentially of a silica carrier impregnated with phosphoric acid, the molar ratio of $P_2O_5$ to $SiO_2$ being relatively low, between 0.6 and 0.95, and the content of the crystalline C form of silicon phosphate being relatively high, 75–95%. These catalyst which are both highly active and selective are prepared by heating a mixture of silica impregnated with phosphoric acid to 550–1000° C., and then contacting the resultant heated mixture with steam at 100–300° C. For the best mechanical properties of the catalyst, the silica carrier should have an $SiO_2$ content of 96–99% by weight.

---

This invention relates to a process for manufacturing a solid catalyst consisting of a silica-containing carrier and phosphoric acid, and containing a total of 60 to 70% by weight of phosphoric acid, expressed as $P_2O_5$, corresponding to molar ratios of $P_2O_5$ to $SiO_2$ between 0.6 and 0.95, said process comprising, in a first step, heating up a mixture of silica with phosphoric acid, preferably a polyphosphoric acid, to a temperature between 550 and 1000° C., preferably between 650 and 850° C., said mixture containing at least 60% by weight, and preferably 60 to 75% by weight, of phosphoric or polyphosphoric acid, thus resulting in a composition having a molar ratio of $P_2O_5$ to $SiO_2$ between 0.6 and 0.95, and thereafter, in a second step, contacting this composition with steam, either pure or diluted with a gas, at a temperature of 100 to 350° C., preferably 150 to 250° C.

During the heating step, losses of $P_2O_5$ often occur; it is thus preferred that in the starting mixture of silica with phosphoric acid (before heating), the molar ratio of $P_2O_5$ to $SiO_2$ be 5 to 10% higher than the desired final ratio.

Many catalysts of the solid phosphoric acid type have been disclosed heretofore, and several of them are industrially available.

The prior art is disclosed, for example, in U.S. Pat. No. 3,112,350. According to this patent, it was known to manufacture catalysts by heating mixtures of phosphoric acid with a silica-containing carrier at temperatures lower than 425° C. except when the heated mixture was further contacted with steam, in which case, the maximum heating temperature is from 455° C. to 510° C., the resulting composition being thereafter reacted with steam at about 230–290° C. The above patent discloses substituting the thus defined catalysts of low activity and poor mechanical strength, with catalysts obtained by heating at a higher temperature (550 to 900° C.) mixtures of higher phosphoric acid content, the molar ratio of $P_2O_5$ to $SiO_2$ being then higher than 1. These catalysts are directly used for treating olefinic feedstocks.

According to the present invention, the catalyst is made from silica of a purity preferably higher than 94% and is subjected not only to a heating at high temperature (550 to 1000° C. and preferably 650 to 850° C.) but also to a further treatment with steam, the molar ratio of $P_2O_5$ to $SiO_2$ being lower than 1.

According to a preferred embodiment, the catalyst is heated in the above temperature range for a time sufficient to decrease the $P_2O_5$ content extractable in one hour with water at 20° C. down to a value lower than 15% but higher than 2% by weight, this content being determined with the powdered catalyst (at least 90% of the particles being lower in size than 100 microns); thereafter the catalyst is activated with steam so as to obtain a $P_2O_5$ content extractable under the above conditions of 1.5 to 15 times, and preferably 2 to 4 times, the content after heating, this content remaining less than 30% by weight in any case. As a result, there is obtained a final catalyst containing a mixture of silicium phosphates of the crystalline types "B," "C" and "D," with a higher proportion, e.g. 75–95% of the "C" phase. These crystalline types may be determined easily by the X-ray diffraction method, for example according to Boulle and Jary in Comptes-rendus de l'Académie des Sciences, July 15, 1953, or to U.S. Pat. No. 3,201,486. In the latter patent, it is shown that the best catalysts contain about 60 to 90% of the crysalline "C" phase and are obtained only with molar ratios of $P_2O_5$ to $SiO_2$ higher than 1, preferably between 1 and 1.5. In fact, catalysts which are so rich in $P_2O_5$ cannot be manufactured easily since their mechanical properties after heating are usually poor.

According to this invention, catalysts may be manufactured with a content of "C" crystalline phase between 75 and 95%, although the molar ratios of $P_2O_5$ to $SiO_2$ are lower than 1, usually between 0.6 and 0.95. These results may be obtained with a silica carrier having a preferred $SiO_2$ content between 94 and 99.5% and a high pore volume, about 80 to 130 cc. per 100 grams. This carrier is subjected to an impregnation with a solution of phosphoric or polyphosphoric acid, so as to attain a final $P_2O_5$ content between 60 and 70% by weight. The resulting composition is thereafter heated in the range of 550 to 1000° C., preferably 650 to 850° C. After heating, the major crystalline type is D; it is very difficult to obtain the crystalline phase C by mere heating, since at these high temperatures and with molar ratios of $P_2O_5$ to $SiO_2$ lower than 1, it is quickly converted to the D phase, the latter giving catalysts of low activity. The process of this invention makes it possible for the "D" phase to revert to the phase C, by means of a re-activation treatment with steam, at temperatures of about 100 to 350° C., preferably 150 to 250° C.

As a rule, the higher the heating temperature, the longer is the activation treatment or the higher the steam pressure. The higher heating temperatures will be associated with the higher $P_2O_5$ contents. Finally, the higher temperatures will be employed with silicas of lower purity.

The preferred carriers contain in the dry state, from 94 to 99.5% by weight of $SiO_2$ and include synthetic porous silica, or natural silica such as diatomaceous earth after a treatment which reduces the content of impurities ($Na_2O$, $K_2O$, CaO, MgO, $Fe_2O_3$ and the like) below 6% by weight. Aluminum silicates, although not excluded, are less desirable. However, the best results have been obtained with silica carriers having a $SiO_2$ content between 96 and 99%. With contents lower than 96%, the catalyst has to be heated up to temperatures higher than 850° C., which results in very long reactivation periods which are expensive and increase the final cost of the catalyst; with contents higher than 99%, the catalyst exhibits poor mechanical properties.

The activation step may follow the heating step immediately or may be carried out later, for example in the apparatus in which the catalyst is to be used, before starting the reaction, although this is less advantageous.

The activation is a known operation which will not be described in great detail here. The preferred stream pressure is between 0.1 and 5 atmospheres, although good results may also be obtained beyond these limits.

As to the choice of the phosphoric acid and the already known steps of the process, attention is invited to the above-mentioned U.S. patents. As described in these patents, the best catalysts will be obtained from phosphoric acid containing about 79 to 90% by weight of $P_2O_5$, known as polyphosphoric acid.

The carrier is admixed with phosphoric acid at a preferred temperature of 10 to 300° C., particularly between 90 and 180° C.

The heating time is preferably 0.5 to 30 hours, these values being not critical.

Although the catalysts according to this invention may be used for all types of polymerizations of mono- or poly-olefins mentioned in the above-stated U.S. patents, and also for alkylation reactions, it has been found that they exhibited a particularly high selectivity in the following condensation reactions: manufacture of heptenes by co-polymerization of propylene with butenes, manufacture of iso-octenes by dimerization of butenes, manufacture of gasoline by condensation of feedstocks having a high content of propylene and/or butenes, trimerization of propylene to manufacture bases for detergents, production of cumene by alkylating benzene with propylene.

The operating conditions are known per se; water is preferably used, in an amount of 50 to 3,000 parts per million of parts by weight, preferably 150 to 800 parts per million. The temperatures are usually between 100 and 300° C.

The following, non-limitative examples are illustrative of this invention:

EXAMPLE 1

Silica extrudates having a $SiO_2$ content of 98% and a pore volume of 105 cc. per 100 grams are subjected to impregnation with a solution of polyphosphoric acid at 140° C., the impregnation time being 2 hours. After impregnation, the resulting composition is dried.

After drying, a first portion is heated up for 2 hours at 300° C. in an oven. This consitutes catalyst A.

Another portion is heated at 500° C. for 2 hours and constitutes catalyst B.

Still another portion is heated at 750° C. for 2 hours and forms catalyst C.

A portion of catalyst C has been re-activated at 150 to 250° C. under atmosphere pressure for 4 hours by means of a mixture of air with steam, each used in an amount of 50 liters per hour per 100 grams of catalyst: this constitutes catalyst D which is one object of this invention.

After manufacture, the total amount of $P_2O_5$ by weight and the amount of $P_2O_5$ extractable in 1 hours with water at 20° C. were determined according to the method of Van Wazer, Griffith and McCullough, Analytical Chemistry, vol. 26, No. 11, November 1954. The results are summarized in Table I.

These four catalysts were also analyzed by the X-ray diffraction method so as to determine the crystalline types; the results are also given in Table I.

TABLE I

| Catalyst | Heating temperature, ° C. | $P_2O_5$ content, weight percent | $P_2O_5$ content extractable in 1 hour with water at 20° C., weight percent | Molar ratio, $P_2O_5$/$SiO_2$ | Crystalline phases, weight percent | | |
|---|---|---|---|---|---|---|---|
| | | | | | B | C | D |
| A | 300 | 64 | 46 | 0.75 | 75 | 0 | 0 |
| B | 500 | 65 | 28 | 0.785 | 61 | 34 | 0 |
| C | 750 | 67 | 5 | 0.86 | 4 | 54 | 42 |
| D | 1 750 | 66 | 18 | 0.82 | 5 | 93 | 2 |

1 With reactivation.

These 4 catalysts were used for polymerizing the olefinic feedstock $C_3$ and $C_4$ in view of producing heptenes. The latter are starting materials for manufacturing plasticizers of the "octyl phthalate" type. The composition by weight of the olefinic feedstock was as follows:

|  | Percent |
|---|---|
| Saturated hydrocarbons ($C_3$+$C_4$) | 2.5 |
| Propylene | 34.0 |
| 1-butene+2-butenes | 32.2 |
| Iso-butene | 30.5 |
| 1,3-butadiene | 0.6 |
| Iso-pentane | 0.1 |

Water: 200 parts per million.

The operating conditions as well as the results are summarized in Table II; the pressure was 70 bars.

TABLE II

| Catalyst | Operating conditions | | Conversion rate per run, percent | Selectivity to heptenes |
|---|---|---|---|---|
| | Reaction temperature, ° C. | Feeding rate (V.V.H.) | | |
| A | 250 | 6 | 81 | 24 |
| B | 250 | 5 | 80 | 35 |
| C | 250 | 2 | 58 | 43 |
| D | 250 | 4 | 79 | 51.5 |

NOTE.—V.V.H. is the hourly volume of liquid feed charge per volume of catalyst. The conversion rate per run is given with respect to the starting olefins. The analysis of the product is made by mass spectrometry.

This table shows the high activity of catalyst "D" according to this invention.

Catalysts A and B are very active, although not selective, since their $P_2O_5$ content extractable in one hour with water at 20° C. is too high and the crystalline type B predominates. Conversely, catalyst C has a low activity since the proportion of the D phase is high, and the $P_2O_5$ content extractable with water at 20° C. is too low.

It is thus preferred that the $P_2O_5$ content extractable with water at 20° C. be in the range of 15 to 20%, in order to obtain a mixture of silicium phosphate in which the crystalline type C predominates (more than 75%).

EXAMPLE II

Catalysts A, B and D of example I are used for polymerizing an olefinic $C_4$ cut in view of producing isooctenes.

The composition of the $C_4$ feed charge was the following:

|  | Percent |
|---|---|
| 1-butene | 28.2 |
| 2-butene | 20.5 |
| Isobutene | 46.3 |
| Butadiene | 0.98 |
| n-butane | 2.98 |
| Isobutane | 0.87 |
| Isopentane | 0.17 |

Water: 200 parts per million.

The operating conditions were as follows:
Temperature: 250° C.
Pressure: 70 bars
Rate of liquid feed charge (V.V.H.): 4

The results are summarized in Table III.

TABLE III

| Catalyst | Conversion rate per run, percent | Selectivity to isooctenes, percent | $C_8$ isomers | | |
|---|---|---|---|---|---|
| | | | Trimethyl pentenes | Dimethyl hexenes | Methyl heptenes |
| A | 83 | 64 | 70 | 23 | 7 |
| B | 81 | 78 | 83 | 13 | 4 |
| D | 78 | 95 | 98 | 2 | 0 |

Here again, catalyst D of this invention gives superior results. The selectivity to iso-octenes is very high and, above all, among the various ethylenic isomers of the $C_8$ type, there are 98% of trimethylpentenes; it is well-known that, among the $C_8$ isomers, the latter are those for which the octane rating changes the least after hydrogenation.

Thus this catalyst is quite convenient for producing gasoline of high octane number.

EXAMPLE III

Catalyst D of Example I has been used for polymerizing an olefinic $C_4$ cut, in order to produce gasoline of high octane rating.

The composition by weight of the $C_4$ cut was the following:

| | Percent |
|---|---|
| 1-butene | 17.6 |
| 2-butenes | 12.9 |
| Isobutene | 28.8 |
| Butadiene | 0.6 |
| n-Butane | 25 |
| Isobutane | 15 |
| Isopentane | 0.1 |

Water: 200 parts per million.

The operating conditions are those of Example II. The results are given in Table IV.

TABLE IV

| Conversion rate per run with respect to the initial olefins, percent | Octane number, Research clear | Distillation A,S,T,M, (pressure: 761 mm, Hg) | |
|---|---|---|---|
| 78 | 100 | 5% | 80° C. |
| | | 10% | 94° C. |
| | | 20% | 97° C. |
| | | 30% | 99° C. |
| | | 40% | 101° C. |
| | | 50% | 103° C. |
| | | 60% | 107° C. |
| | | 70% | 111° C. |
| | | 80% | 122° C. |
| | | 90% | 147° C. |
| | | 95% | 178° C. |
| | | Final point | 196° C. |
| | | Residue | 0.8% |
| | | Loss | 0.7% |

This shows the high quality of the gasoline obtained according to this invention.

The Research clear octane number is very high (100), and from the ASTM distillation point of view, this gasoline conforms with the specifications for the final boiling point; most of these specifications require a final boiling point below 200° C. The product of this invention conforms to this (final point: 196° C.).

This result is of major importance for the cost of the process, since, with the catalyst of this invention, there will be no need for any additional distillation column (rerun column) to cut this gasoline at 200° C., when the colour specifications are met.

A portion of the obtained gasoline has beeen hydrogenated in the presence of a catalyst containing nickel on silica; after complete hydrogenation the Research clear octane number was 99.

EXAMPLE IV

Catalysts A, B and D of Example I have been used for polymerizing propylene in order to produce propylene trimers.

The operating conditions were as follows:

temperature: 200° C.
pressure: 70 bars
liquid feed rate (V.V.H.): 3

The results are given in Table V

TABLE V

| Catalyst | Conversion rate of propylene per run, percent | Selectivity to trimers |
|---|---|---|
| A | 85 | .53 |
| B | 83 | 64 |
| D | 80 | 81 |

Here again, the results show the higher quality of the catalyst of this invention. For about the same conversion rates per run, the selectivity to trimers is significantly higher.

EXAMPLE V

Catalysts A, B and D of Example I are used for producing cumene by alkylating benzene with propylene.

The operating conditions are as follows:

temperature: 250° C.
pressure: 50 bars
feed rate: 2 volumes of benzene per volume of catalyst and per hour
molar ratio of benzene to propylene: 6

The results are given in Table VI. Here again the catalyst of this invention gives better results.

TABLE VI

| Catalyst | Conversion rate of propylene, percent | Yield of cumene with respect to consumed benzene |
|---|---|---|
| A | 100 | 147 |
| B | 100 | 149.5 |
| D | 100 | 152 |

What we claim as this invention is:

1. A process for manufacturing a solid catalyst, consisting essentially of a silica carrier and phosphoric acid, said process comprising, in a first step, heating at 550 to 1,000° C. a mixture of silica with phosphoric acid, said mixture containing at least 60% by weight of phosphoric acid, thereby obtaining a composition in which the molar ratio of $P_2O_5$ to $SiO_2$ is between 0.6 and 0.95, and, in a second step, contacting at 100–300° C. the previously heated catalyst with steam so as to activate the same.

2. The process of claim 1, in which the first step is carried out at 650 to 850° C.

3. The process of claim 1, wherein phosphoric acid is in the form of polyphosphoric acid.

4. The process of claim 1, wherein the mixture of silica with phosphoric acid contains 60 to 75% by weight of phosphoric acid.

5. The process of claim 1, wherein the second step is carried out at 150 to 250° C.

6. The process of claim 1, wherein the contact with steam is conducted under a steam pressure of 0.1 to 5 atmospheres.

7. The process of claim 1, wherein the heating at 550 to 1,000° C. is continued until the $P_2O_5$ content extractable in one hour with water at 20° C. be lower than 15% and higher than 2%, and the contacting with steam is continued until the $P_2O_6$ content extractable under the same conditions be equal to 1.5 to 15 times the content after heating, the content of the crystalline form C of silicium phosphate being between 75 and 95%.

8. The process of claim 1, wherein the purity of silica is at least 94%.

9. The process of claim 8, wherein the purity of silica is between 96 and 99%.

10. The process of claim 1, wherein silica has a pore volume between 80 and 130 cc. per gram.

11. A solid catalyst as produced by the process of claim 1 consisting essentially of a silica carrier and phosphoric acid, the molar ratio of $P_2O_5$ to $SiO_2$ being between 0.6 and 0.95, and the content of the crystalline C form of silicium phosphate being between 75 and 95%.

12. A catalyst as defined by claim 11, wherein said silica carrier has an $SiO_2$ content of 96–99% by weight.

13. A catalyst as defined by claim 12, wherein said catalyst contains 60–70% by weight phosphoric acid expressed as $P_2O_5$, and the silica carrier has a pore volume of about 80 to 130 cc. per 100 grams.

References Cited

UNITED STATES PATENTS

| | | | |
|---|---|---|---|
| 3,112,350 | 11/1963 | Bielawski et al. | 252—435 X |
| 2,234,177 | 3/1941 | Kanhofer | 252—435 X |
| 2,275,182 | 3/1942 | Ipatieff et al. | 252—435 |
| 2,231,452 | 2/1941 | Morrell | 252—435 X |
| 2,438,215 | 3/1948 | Ipatieff et al. | 252—435 X |
| 3,304,343 | 2/1967 | Mitsutani | 252—435 X |

PATRICK P. GARVIN, Primary Examiner

U.S. Cl. X.R.

252—437; 260—671 C, 683.15 C, 683.2